United States Patent [19]

Neal

[11] Patent Number: 4,907,131

[45] Date of Patent: Mar. 6, 1990

[54] FUSED CAPACITOR

[75] Inventor: Barry E. Neal, Simpsonville, S.C.

[73] Assignee: Union Carbide Chemicals and Plastics Company Inc., Danbury, Conn.

[21] Appl. No.: 333,280

[22] Filed: Apr. 5, 1989

[51] Int. Cl.$^4$ .............................................. H01G 9/00
[52] U.S. Cl. .................................................... 361/534
[58] Field of Search .................... 357/70, 72; 361/306, 361/275, 532, 534, 540

[56] References Cited

U.S. PATENT DOCUMENTS

| | | | |
|---|---|---|---|
| 3,781,976 | 1/1974 | Tomiwa | 361/540 X |
| 4,106,184 | 8/1978 | Fournier et al. | 29/570.1 |
| 4,107,762 | 8/1978 | Shirn et al. | 361/534 |
| 4,224,656 | 9/1980 | DeMoto et al. | 361/534 |
| 4,510,554 | 4/1985 | Irikura | 361/540 |
| 4,720,772 | 1/1988 | Yamane et al. | 361/275 X |
| 4,763,228 | 8/1988 | Su | 361/534 |

OTHER PUBLICATIONS

Japanese Kokai No. 62-272156 (Nov. 26, 1987).
Japanese Kokai No. 63-128707 (Jun. 1, 1988).

Primary Examiner—Donald A. Griffin
Attorney, Agent, or Firm—Norman L. Balmer

[57] ABSTRACT

Lead frame assemblies for making fused capacitors, such as solid electrolyte capacitors, have cross ties that extend between the anode side and cathode side of the lead frame between every space intended to be occupied by a capacitor and have a fuse tie extending between the cross ties. The anode from the solid electrolytic capacitor body is attached to the fuse tie and a fuse conductor is positioned in an electrically conductive manner between the fuse tie and an anode lead. The assemblies may also be used to make non-polar dielectric capacitors.

26 Claims, 1 Drawing Sheet

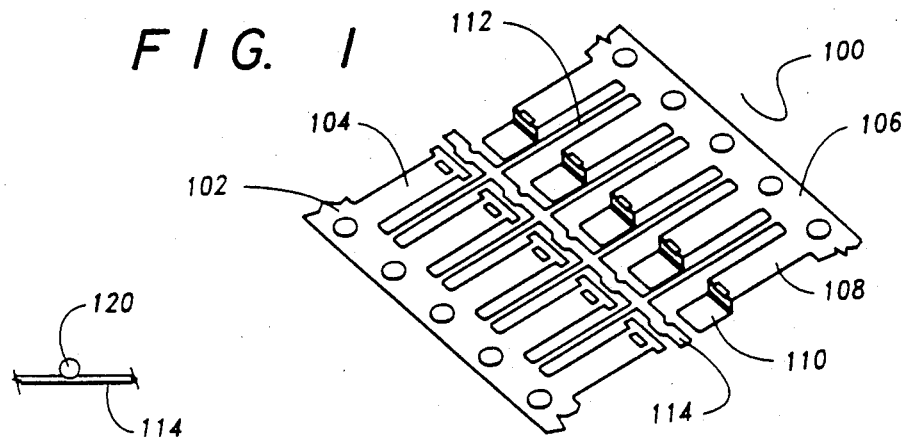
FIG. 1
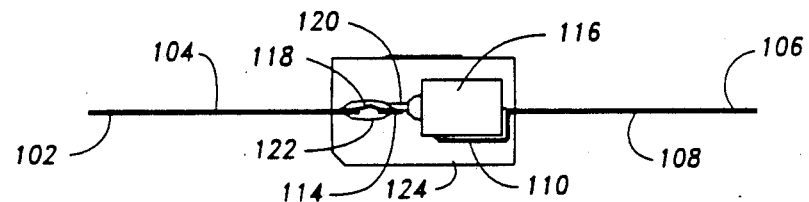
FIG. 4
FIG. 2
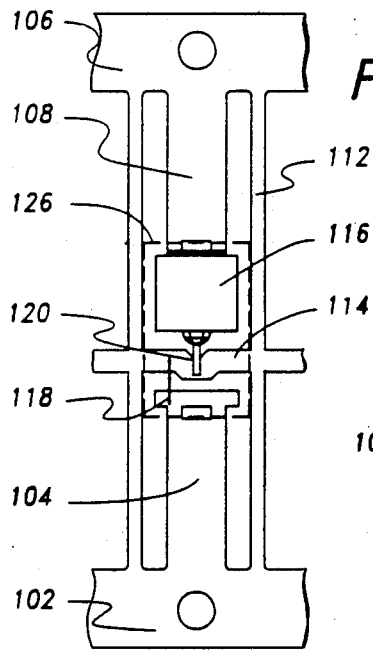
FIG. 3
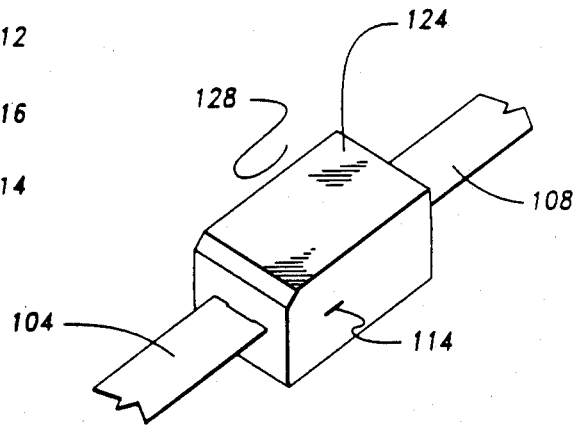
FIG. 5

FUSED CAPACITOR

This invention pertains to fused capacitors, especially solid electrolyte capacitors, and lead frames which facilitate assembling these capacitors.

BACKGROUND OF THE INVENTION

Solid dielectric capacitors are well-known and commonly used in electrical circuits. In many instances, fused capacitors are desired such that excessive current will be interrupted by the fuse in the capacitor and prevent damage to other components in the circuit. With respect to solid electrolyte capacitors such as tantalum capacitors, the capacitors have a defined polarity, i.e., defined anodes and cathodes. If these solid electrolyte capacitors are installed in a circuit backwards, the capacitor will not function properly. Consequently, fusing can prevent damage to the electrical circuit caused by the incorrect installation of the capacitor. Moreover, with tantalum capacitors, fusing is desired in applications where high power levels are present, since a short circuit can possibly result in enough heat being generated to ignite the tantalum metal which burns exothermically.

Fused capacitor assemblies are disclosed, for instance, in U.S. Pat. Nos. 4,106,184; 4,107,762; 4,224,656; and 4,763,228, and in Japanese laid-open patent applications (Kokai) 62-272156 and 63-128707. In one type of capacitor, the fuse extends between terminals inside the encapsulating insulator of the capacitor such that all electrical . 2 current current passing between the terminals passes through the fuse.

Numerous advances in fuse materials have occurred. Exothermic fuses are generally preferred and widely used. Unlike conventional fuses that are adapted to melt at a predetermined current level, exothermic fuses contain metals which alloy exothermically when brought to a threshold temperature. The exothermic alloying breaks electrical continuity. Typical exothermic fuses comprise a bimetallic composite of aluminum and a precious metal such as palladium. Su, in U.S. Pat. No. 4,763,228, discloses a further improvement in exothermic fuse assemblies in which the fuse material is surrounded by silicone such that when the fuse ignites, an electrically-conductive carbon residue does not result which could otherwise serve to conduct electricity between the terminals.

Particular attention has been directed by workers in the field to the manufacture of capacitors (particularly electrolytic capacitors) containing fuses, especially exothermic fuses, and the design of the capacitors to assure reliable performance of the fuses. Capacitor assembly, in order to be competitive, must be capable of being automated. To facilitate automation, lead frames containing the electrode leads for a plurality of capacitors are used and the capacitor is built on these frames. The frames can be easily transported from station to station. The use of these frames is virtually mandated by the miniaturization of capacitors which can be too small to easily handle on a capacitor-by-capacitor basis.

The lead frames should therefore be designed to enable all assembly operations to be automated. Automating the installation of the fuse wire is particularly difficult in that the fuse wire is delicate, e.g., may only be 0.002 inch in diameter, and, if an exothermic fuse is used, risks of igniting the fuse during installation exist.

The ease of fabrication, however, cannot be at the expense of performance. For example, when assembling circuit boards, the components such as capacitors are typically inserted in the boards and then the boards are bathed in solder. Any solder bridging that may occur between the terminals bridging the fuse would defeat the purpose of the fuse.

Japanese Kokai 62-272516, Nov. 26, 1987, discloses a fused, electrolytic capacitor in which a lead frame has a cathode lead (negative lead) and either a "U"-shaped or "L"-shaped lead positioned between the anode lead (positive lead) and the electrolytic capacitor body (i.e., the component of the capacitor performing the electronic function). A wire extends from the electrolytic capacitor body to the either "U"-shaped or "L" shaped lead and a fuse extends between that lead and the anode lead. This type of capacitor design can provide several problems. First, both the "U"-shaped (or "L"-shaped) lead and the anode lead extend from the insulating casing in close proximity. This increases the risk of solder bridging. Second, especially with the "L"-shaped lead, it is relatively easy for this lead and the anode lead to move with respect to each other making automated assembly more difficult. Further, severing the "U"-shaped or "L"-shaped lead from the lead frames poses difficulties especially in view of its proximity to the anode lead.

Japanese Kokai 63-128707, June 1, 1988, discloses another electrolytic capacitor design. In making this capacitor, a lead frame is used which has a plurality of anode leads and a plate, or ribbon, perpendicular to the anode leads which join each of the anode leads at the ends intended to be encapsulated in insulator material. The ribbon has elongated slots such that the sides of the ribbon are joined only between the capacitors when assembled. The anode lead wire from the electrolytic capacitor body is attached to one side of the ribbon. A fuse is installed to provide electrical communication between the sides of the ribbons. After assembly of the fuse, the capacitor is severed. A cutting block is used in severing the ribbon or more exotic means such as laser cutting is used, either of which increase the complexity of automated assembly. When using a cutting block, the capacitor is placed on the block and a blade is used to sever the ribbon on each side of the encapsulated capacitor. While this design provides greater stability than that described above and severing the ribbon is facilitated, there remain drawbacks. For instance, the close proximity of each side of the ribbon as it protrudes from the encapsulating insulator provides significant risk of solder bridging.

SUMMARY OF THE INVENTION

By this invention a lead frame has been provided which facilitates the assembly of fused, solid dielectric capacitors by automated means and provides capacitors having desirable performances. In accordance with this invention, the lead frames have cross ties that extend between the first electrode side and the other electrode side of the lead frame between every space intended to be occupied by a capacitor and a fuse tie which extends between the cross ties. The fuse tie is intended to be in electrical contact with an electrode of the solid dielectric capacitor body and to receive a fuse conductor which is also connected to the first electrode lead from the lead frame.

The fuse tie, by being secured to the cross ties, has desirable positional stability such that automated assembly is facilitated. Furthermore, the first electrode lead and the fuse tie are positioned relatively far apart as they extend from an encapsulating insulator surrounding the dielectric capacitor body such that little, if any, risk of solder bridging exists. The increased strength to the lead frame provided by the cross ties and the fuse tie has also proven to enable breaking the fuse ties at each side of the capacitor after encapsulation without the need for special cutting blocks or laser cutting systems.

In preferred aspects of the invention, the fuse tie can be relatively large, e g., thicknesses of at least 50 microns, say, about 0.004 to 0.015 inches, and widths of at least about 0.25, say, about 0.5 to 2 millimeters. This large size enables not only increased strength, but also minimizes the likelihood of the fuse tie warping when, for instance, in an electrolytic capacitor the axial anode lead from the electrolytic capacitor body is welded to the fuse tie. Additionally, the surface area of the fuse tie facilitates exothermic alloying fuses to be ultrasonically bonded to the fuse tie since the energy from the ultrasonic bonding can more readily be accommodated. As a further benefit, the end fuse tie which is exposed at the exterior of the encapsulating insulator can be sufficiently large to enable the integrity of the fuse to be checked.

In another aspect of the invention, the fuse tie and the first electrode lead from the lead frame can be in the same plane which facilitates automated assembly operations.

DESCRIPTION OF THE DRAWINGS

FIG. 1 is a schematic representation of a portion of a lead frame assembly in accordance with this invention.

FIG. 2 is a breakaway cross-section depiction of a lead frame assembly in accordance with this invention on which a solid electrolytic capacitor body, fuse conductor and encapsulating insulator have been installed.

FIG. 3 is a schematic representation of a portion of a lead frame assembly on which a solid electrolytic capacitor body and fuse conductor have been installed.

FIG. 4 is a schematic depiction of the juncture between the axial anode lead from a solid electrolytic capacitor body and the fuse tie.

FIG. 5 is a perspective view of a capacitor in accordance with the invention.

DETAILED DISCUSSION

The following discussion will be made with reference to solid electrolyte capacitors which are polar and have an anode (positive electrode) and a cathode (negative electrode). It will be readily apparent that the principles described herein are applicable to non polar dielectric capacitors.

With reference to FIG. 1, a lead frame assembly 100 is provided with a plurality of regions adapted to receive the components for manufacturing a capacitor. In this manner, the manufacture of capacitors can be performed efficiently and through automated manufacturing techniques. The lead frame assembly is conveniently of unitary construction of electrically conductive material which is capable of being soldered and welded.

The lead frame assembly comprises a rigid anode tie frame 102 having a plurality of spaced-apart, rigid anode leads 104 extending therefrom. While the material o the lead frame assembly may be capable of bending, sufficient rigidity exists such that the lead frame members retain the desired spacial relationships during handling and processing. Often, the material of the lead frame assembly exhibits a modulus of elasticity of at least about $15 \times 10^6$ pounds per square inch (psi). Metals useful for the lead frame assembly include nickel, copper-nickel-zinc alloys, etc.

Parallel to the anode tie frame 102 is rigid cathode tie frame 106 having a plurality of spaced cathode leads 108 extending therefrom. For the sake of convenience, the cathode tie frame and the anode tie frame fall within the same plane. As depicted, the cathode leads 108 bend such that the end portions 110 of each cathode lead fall below the plane defined by the anode lead frame 102 and cathode lead frame 106. With this relationship, the axial anode lead from the solid electrolytic capacitor body is substantially in the plane defined by the anode lead frame 102 and cathode lead frame 106 when the solid electrolytic capacitor body contacts the end portion 110 of the cathode lead. In solid electrolytic capacitor bodies, the exterior surface of the body is generally the cathode surface and cathode lead 108 is therefore adapted to contact the cathode surface of the electrolytic capacitor body.

Extending between the anode tie frame 102 and cathode tie frame 106 are cross ties 112. A cross tee 112 is positioned between each cathode lead 108 and anode lead 104 pair intended to be assembled into a capacitor. The cross tie can be in substantially the same plane as the anode tie frame 102 and cathode tie frame 106 for ease of handling. A fuse tie 114 extends substantially perpendicular between each cross tie 112 in substantially the same plane as the cross ties. The fuse tie 114 is intermediate the anode lead 104 and the cathode lead 108 which are paired by adjacent cross ties. A zone for receiving a solid electrolytic capacitor body (having an axial anode lead extending therefrom) is defined by the fuse tie, the adjacent cross ties and the anode tie frame. The zone is such that the electrolytic capacitor body can be in electrical contact with the cathode lead and the axial lead from the electrolyte body can be in contact with the fuse tie 114. The fuse tie 114 is spaced away from anode lead 104 and both the fuse tie 114 and anode lead 104 are adapted to receive opposite ends of a fuse conductor.

This spacial relationship can be readily appreciated from FIG. 2 and FIG. 3. (In all of the figures, like reference numerals refer to like parts.) Both figures depict a solid electrolytic capacitor body 116 and a fuse conductor 118 in position. The solid electrolytic capacitor body base comprises an anodized valve metal as dielectric material in a form suitable for providing capacitance. Dielectric materials that have been proposed include the oxides of tantalum, aluminum and niobium. In typical tantalum capacitors a tantalum axial lead is welded to or otherwise contacted with a tantalum body which is treated at its exterior surface to form a dielectric layer. The electrolytic capacitor body will have other coatings on the dielectric layer such as manganese dioxide or other electrolyte material and carbon and/or silver to provide or enhance capacitor performance and/or facilitate electrical contact with cathode lead 108.

While the foregoing discussion has been with respect to electrolytic capacitors, the dielectric material is not critical to the inventions and may be any solid material capable of providing the desired capacitance. Hence, the invention can find utility in non-polarized, dielectric capacitors in which the dielectric capacitor body comprises ceramics, barium titanate, lead perovskites, etc.

As can be seen from FIG. 2, the solid electrolytic capacitor body has an exterior surface in contact with end portion 110 of cathode lead 108. This contact is electrically conductive and can be effected by any suitable means including, but not limited to, solder and electrically conductive adhesives. The solid electrolytic capacitor body 116 as extending therefrom axial lead 120. The axial lead 120 is an anode lead and, for example, for tantalum capacitors is a tantalum lead. The axial lead 120 is attached in an electrically conductive manner to the fuse tie 114. The attaching can be by any suitable means including, but not limited to, solder, welding, electrically conductive adhesives and the like. Axial lead 120 should not contact anode lead 104.

FIG. 2 and FIG. 3 also depict a fuse conductor 118 extending between the fuse tie 114 and the anode lead 104. While any type of fuse conductor can be used, the preferred fuse conductors are exothermic fuses comprising a reactive bimetal, e.g., aluminum and palladium, that exothermically alloy upon reaching a threshold temperature. Bimetal fuses can also be fabricated from low melting metals such as magnesium and magnesium-aluminum alloys with palladium, copper, silver and other base metals. Palladium is often a preferred metal in exothermic fuses. The exothermic fuses may be constructed with one component of the bimetal sheathed by the other. Typically, palladium has surrounded aluminum or aluminum alloy, and in some instances, a hardening component such as ruthenium has been added to the palladium. Especially when ultrasonically bonding the fuse conductor, it is desirable to make the exterior sheath of a malleable metal or alloy such as aluminum or aluminum alloy.

Each end of the fuse conductor 118 is attached in an electrically conductive manner. Especially if exothermic fuses are employed, the means by which the fuses are attached can be important since high temperatures approaching the kindling point of the bimetal of an exothermic fuse or the melting point of the metal of a conventional fuse must be avoided. Moreover, the means for attaching the fuse conductor should be reliable such that failures do not occur. One particularly attractive means for attaching the fuse conductor to each of the fuse tie and anode lead is by ultrasonic bonding. There are two aspects of the lead frame assemblies of this invention that facilitate using ultrasonic bonding of fuse conductors. First, the fuse tie 114 is spacially stable since it extends perpendicularly between cross ties 112 and is in the same plane as anode lead 104. This stability and positioning facilitate the use of automated equipment for ultrasonic bonding. Second, the fuse tie 114 and anode lead 104 can be made sufficiently large to aid in accommodating the energy generated by ultrasonic bonding.

Because of the need to avoid high temperatures when using exothermic fuse conductors, the axial lead 120 from the solid electrolytic body 116 is typically attached to fuse tie 114 prior to installing the fuse conductor 118. The attaching is often done by welding. Common welding operations involve the generation of a sufficiently high temperature that the material of fuse tie 114 melts and/or becomes alloyed with the material of the axial lead 120 from the electrolytic capacitor body. FIG. 4 depicts the localized deformation caused by the welding of axial lead 120 and fuse tie 114. Because of the energy generated, the welding operations could deform the fuse tie beyond the localized region of the weld. Any warping or deformation of the fuse tie may make any subsequent operation to ultrasonically bond the fuse conductor to the fuse tie more difficult because of spacial irregularities. Since the assemblies of this invention can permit the use of relatively large fuse ties, the extent of deformation beyond the immediate region of the weld of the axial lead 120 to the fuse tie can be minimized. Fuse ties having a thickness of at least about 50 microns and width of at least about 0.5 millimeter, are generally able to dissipate heat during welding and have sufficient structural strength to avoid undue warping or other spacial distortion during the welding of the axial lead 120.

Reference to FIG. 3 readily reveals that inspection of the assembly can be easily conducted prior to encapsulation with insulator material.

FIG. 2 depicts sheath 122 surrounding fuse conductor 118. Sheath 122 is particularly useful for exothermic fuses which can generate sufficient heat to char hydrocarbon based polymer. The charring of hydrocarbon-based polymer can result in an electrically conductive path between the anode lead 104 and fuse tie 114 to defeat the purpose of the fuse. Sheath 122 is composed of material which does not become, or convert to, electrically conductive material upon the release of the exothermic energy from the fuse. Suitable materials include silicones and glass wool.

The capacitor assembly can be encased in insulator casing 124. The insulator is unitary, i.e., it surrounds the solid electrolytic capacitor body 116 and fuse conductor 118 to protect them from damage or performance deterioration due to infiltration of air, moisture, etc. The exterior, or boundary, of the insulator casing extends over a portion of the anode lead 104 and a portion of cathode lead 108. The fuse conductor 118 and a portion of the fuse tie 114 and the cross ties 112, anode tie frame 102 and cathode tie frame 106 are outside the boundary of the solid insulator. The dotted line 126 in FIG. 3 represents where the boundary of insulator casing 124 would be positioned. The insulator casing 124 may be constructed from any suitable insulating material, i.e., having a conductance of less than about $10^{-11}$ mhos. Typical insulating materials include thermoplastic and thermosetting resins with the latter being preferred. Exemplary materials include epoxies which are curable at substantially lower temperatures than the threshold temperature of any exothermic fuse used. The insulator casing 124 is typically formed by injection molding.

After the encapsulation, the capacitor 128 as depicted in FIG. 5, can be removed from the lead frame assembly 100. The anode lead 104 and cathode lead 108 can be severed in any convenient manner and extend beyond the exterior of the insulator casing 124. Fuse tie 114 is preferably severed to be flush with the exterior of insulator casing 124. Because of the structural strength provided by the cross ties 112, the severing may readily be accomplished by forcing a blade or bar along the side of the insulator casing 124 and snapping the fuse tie. Without the support by the cross ties 112, the fuse tie 114 would tend to bend rather than being severed by the application of such a force.

In the capacitor 128, the portions of the fuse tie 114 that are exposed at the sides of the insulator casing 124, are remote from anode 104 and cathode lead 108 thereby prevent any risk of solder bridging. Moreover, the exposed portions of the fuse tie 114 can be of a sufficient size to permit checking the integrity of the fuse conductor 118.

It is claimed:

1. A unitary lead frame for the assembly of molded, fused solid dielectric capacitors comprising:
   (a) a rigid first electrode tie frame having a plurality of spaced-apart, rigid first electrode leads extending therefrom;
   (b) a diametrically opposed rigid second electrode tie frame having a plurality of spaced-apart second electrode leads extending therefrom, each of said second electrode leads being adapted to be in electrical communication with a second electrode of a solid electrolytic capacitor body;
   (c) a rigid cross tie extending between the first electrode tie frame and the second electrode tie frame between first electrode lead and second electrode lead pairs, said cross tie being in substantially the same plane as said first electrode tie frame and said second electrode tie frame; and
   (d) a rigid fuse tie extending substantially perpendicularly between adjacent cross ties and in substantially the same plane as the cross ties, said fuse tie being intermediate the first electrode lead and the second electrode lead of the first electrode lead and second electrode lead pair defined by said adjacent cross ties, said fuse tie defining a zone between the cross ties and the second electrode tie frame which zone is adapted to receive a solid dielectric capacitor body such that a first electrode of the dielectric capacitor body can be in electrical communication with the fuse tie and a second electrode of the dielectric capacitor body can be in electrical communication with the second electrode lead, and wherein said fuse tie is spaced away from the first electrode lead and both the first electrode lead and the fuse tie are adapted to receive opposite ends of a fuse conductor.

2. The lead frame of claim 1 which is for the assembly of solid electrolyte capacitors and
   (i) the first electrode tie frame is an anode tie frame;
   (ii) the first electrode lead is an anode lead;
   (iii) the second electrode tie frame is a cathode tie frame;
   (iv) the second electrode lead is a cathode lead;
   (v) the dielectric capacitor body to be received in the zone defined by the fuse tie, adjacent cross ties and the cathode tie frame is an electrolytic capacitor body having an axial anode lead and a cathode on a portion of its exterior surface;
   (vi) the fuse tie is adapted to receive the axial anode lead of the electrolytic capacitor body; and
   (vii) the cathode lead is adapted to contact at least a portion of the cathode of the electrolytic capacitor body.

3. The lead frame of claim 2 further comprising a fuse conductor extending in electrical contact between the fuse tie and the anode lead.

4. The lead frame of claim 3 wherein the fuse conductor is an exothermic fuse.

5. The lead frame of claim 3 wherein the fuse conductor is ultrasonically bonded to each of the fuse tie and anode lead.

6. The lead frame of claim 2 wherein the fuse tie is of sufficient size to accommodate the energy generated by ultrasonically bonding an exothermic fuse conductor without damaging the fuse conductor.

7. The lead frame of claim 2 wherein the fuse tie is of sufficient size to accommodate welding an axial anode lead from a solid electrolytic capacitor body without unduly distorting the fuse tie beyond the weld.

8. The lead frame of claim 2 having at least one solid electrolytic capacitor body comprising an axial anode lead and a cathode surface, which body is positioned intermediate the fuse tie and cathode tie and between cross ties, and the axial anode lead is in electrical contact with the cross tie and the cathode lead is in electrical contact with at least a portion of the cathode surface of the electrolyte body.

9. The lead frame of claim 8 further comprising a fuse conductor extending in electrical contact between the fuse tie and the anode lead.

10. The lead frame of claim 9 wherein the fuse conductor is an exothermic fuse.

11. The lead frame of claim 9 wherein the fuse conductor is ultrasonically bonded to each of the fuse tie and anode lead.

12. The lead frame of claim 9 wherein a unitary solid insulator casing defines a boundary encapsulating the solid electrolytic capacitor body and extends over a portion of the anode lead, a portion of the cathode lead, the fuse conductor, and a portion of the fuse tie and wherein the cross ties, cathode tie frame and anode tie frame are outside the boundary of the solid insulator casing.

13. The lead frame of claim 12 further comprising a fuse conductor extending in electrical contact between the fuse tie and anode lead.

14. The lead frame of claim 13 wherein the fuse conductor is an exothermic fuse.

15. The lead frame of claim 13 wherein the fuse conductor is ultrasonically bonded to each of the fuse tie and anode lead.

16. A fused capacitor comprising:
   (a) a unitary solid insulator casing having an exterior surface defining a front portion, a rear portion, two lateral portions, an upper portion and a lower portion;
   (b) a solid dielectric capacitor body having a first electrode and a second electrode, said body being surrounded by said insulator casing;
   (c) a second electrode lead in electrical contact with the second electrode of the dielectric capacitor body and extending through the exterior surface of the insulator casing;
   (d) a fuse tie extending between the two lateral portions of the insulator casing exterior which fuse tie is in electrical contact with the first electrode of the electrolyte body;
   (e) an electrically isolated first electrode lead extending from the insulator casing; and
   (f) a fuse conductor in electrical contact with the fuse tie and the first electrode lead.

17. The capacitor of claim 16 in which:
   (i) the dielectric capacitor body is a solid electrolytic capacitor body having an axial anode lead and a cathode on a portion of its exterior surface;
   (ii) the second electrode lead is a cathode lead which is in contact with at least a portion of the cathode surface of the electrolytic capacitor;
   (iii) the axial anode lead from the solid electrolytic capacitor is in contact with the fuse tie; and
   (iv) the first electrode lead is an anode lead.

18. The capacitor of claim 17 wherein the anode lead extends from the front portion of the insulator casing and the cathode lead extends through the rear portion of the insulator casing.

19. The capacitor of claim 18 wherein the fuse tie is exposed at each lateral portion of the insulator.

20. The capacitor of claim 17 wherein the fuse conductor is an exothermic fuse.

21. The capacitor of claim 17 wherein the fuse conductor is ultrasonically bonded to each of the fuse tie and anode lead.

22. The capacitor of claim 17 wherein the fuse tie is of sufficient size to accommodate the energy generated by ultrasonically bonding an exothermic fuse conductor without damaging the fuse conductor.

23. The capacitor of claim 17 wherein the axial anode lead from the solid electrolytic capacitor body is welded to the fuse tie and the fuse tie is of sufficient size to accommodate the welding without unduly distorting the fuse tie beyond the weld.

24. The capacitor of claim 17 wherein the fuse tie is at least about 50 microns in thickness and about 0.05 millimeters wide.

25. A fused, solid dielectric capacitor comprising a solid dielectric capacitor body having a first electrode lead and a second electrode lead in electrical contact therewith, said dielectric capacitor body and a portion of said first electrode lead and said second electrode lead being encased in an insulator casing, wherein at least one of said electrode leads is electrically discontinuous and has an exothermic fuse extending between the electrically discontinuous portions of said electrode lead, said exothermic fuse comprising palladium with an exterior sheath of a malleable metal or alloy capable of being ultrasonically bonded, wherein said exothermic fuse is ultrasonically bonded at opposite ends to each of said electrically discontinuous portions of said electrode lead.

26. The capacitor of claim 25 wherein the sheath comprises aluminum or aluminum alloy.

* * * * *